US011064010B2

(12) United States Patent
Periasami et al.

(10) Patent No.: US 11,064,010 B2
(45) Date of Patent: Jul. 13, 2021

(54) DOWNLOAD PROGRESS INFORMATION FOR COMPOSITE FILES

(71) Applicant: Microsoft Technology Licensing, LLC, Redmond, WA (US)

(72) Inventors: Sridhar Periasami, Seattle, WA (US); Harshad R. Sheth, Redmond, WA (US); Jose Emmanuel Miranda-Steiner, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 15/941,707

(22) Filed: Mar. 30, 2018

(65) Prior Publication Data

US 2019/0306222 A1   Oct. 3, 2019

(51) Int. Cl.
*G06F 15/16* (2006.01)
*H04L 29/08* (2006.01)
*H04L 12/26* (2006.01)

(52) U.S. Cl.
CPC .............. *H04L 67/06* (2013.01); *H04L 43/08* (2013.01)

(58) Field of Classification Search
CPC ......... H04L 67/06; H04L 43/08; H04L 67/10; H04L 65/60
USPC ................ 709/217, 218, 219, 203, 226, 227
See application file for complete search history.

(56) References Cited

U.S. PATENT DOCUMENTS

| 6,934,735 | B1 | 8/2005 | Emens et al. |
| 8,024,472 | B1 | 9/2011 | Cobb |
| 9,128,513 | B2 | 9/2015 | Schuller |
| 9,172,622 | B2 | 10/2015 | Whitfield, Jr. et al. |
| 9,800,510 | B2 | 10/2017 | Liu et al. |
| 2005/0273592 | A1* | 12/2005 | Pryor ........................ H04L 9/32 713/150 |

(Continued)

OTHER PUBLICATIONS

"Term: Digital File." Digital File—Glossary—Federal Agencies Digitization Guidelines, Federal Agencies Digitization Guidelines Initiative, May 5, 2009, web.archive.org/web/20090505232055/ www.digitizationguidelines.gov/term.php?term=digitalfile. (Year: 2009).*

(Continued)

*Primary Examiner* — Kaylee J Huang
(74) *Attorney, Agent, or Firm* — Michael Best & Friedrich LLP

(57) ABSTRACT

Systems and methods for tracking the download progress of a composite file. One system includes a notification server and a media server. The notification server provides a token to a user device that uniquely identifies a user session between a browser application and a cloud storage service. The media server receives the token from the browser application associated with a download request for a set of files, creates a composite file including the set of files, transmits the composite file to the user device, and, while transmitting the composite file, transmits progress information and the token to the notification server. The progress information includes a number of files in the composite file transmitted to the user device. The notification server receives the progress information and the token from the media server, determines the user session based on the token, and transmits the progress information to the user device.

18 Claims, 6 Drawing Sheets

(56) References Cited

U.S. PATENT DOCUMENTS

| | | | | |
|---|---|---|---|---|
| 2006/0143135 | A1* | 6/2006 | Tucker | G06F 21/121 705/59 |
| 2007/0288967 | A1* | 12/2007 | Candelore | H04N 5/913 725/50 |
| 2009/0300136 | A1* | 12/2009 | Loo | H04L 67/34 709/217 |
| 2011/0185013 | A1* | 7/2011 | Obata | G06F 8/61 709/203 |
| 2012/0203850 | A1* | 8/2012 | Luo | H04L 51/04 709/206 |
| 2012/0278728 | A1* | 11/2012 | Malin | H04N 21/47202 715/748 |
| 2013/0167138 | A1* | 6/2013 | Ekka | G06F 8/61 717/175 |
| 2013/0263012 | A1* | 10/2013 | Stallings | G06F 16/44 715/748 |
| 2014/0201316 | A1* | 7/2014 | Chinn | H04L 67/06 709/217 |
| 2014/0229582 | A1* | 8/2014 | Liu | G06F 16/152 709/219 |
| 2014/0280696 | A1* | 9/2014 | Veeramani | H04L 67/06 709/217 |
| 2015/0120805 | A1* | 4/2015 | Aghadavoodi Jolfaei | H04L 67/142 709/203 |
| 2016/0085920 | A1 | 3/2016 | Cyran | |
| 2018/0124544 | A1* | 5/2018 | Gupta | H04L 41/082 |

OTHER PUBLICATIONS

Vasudevan, Nithya. "Android: Download Multiple Files Showing Progress Bar." Android: Download Multiple Files Showing Progress Bar the Open Tutorials, Apr. 21, 2013, theopentutorials.com/tutorials/android/dialog/android-download-multiple-files-showing-progress-bar/. (Year: 2013).*

"S-drive s3 amazonaws", Retrieved From <<http://s-drive.s3.amazonaws.com/Docs/1.25/S-Drive%20User%20Guide%201.25.pdf>>, Retrieved on: Jan. 24, 2018, 89 Pages.

* cited by examiner

DOWNLOAD PROGRESS INFORMATION FOR COMPOSITE FILES

FIELD

Embodiments described herein relate to systems and methods for tracking the download progress of a composite file that includes multiple files, such as a compressed file.

SUMMARY

When a user requests a set of files (or a folder including a set of files) to download, such as from a cloud storage service, the set of files are often compressed into a composite file, such as a ZIP file, before being downloaded. As the composite file is being downloaded, the user may be able to see (via a web browser used to access the cloud storage service) a percentage or amount of the composite file that has been downloaded. However, because the web browser is unaware of the size of each file included in the composite file, an order in which the files are being downloaded within the composite file, or the like, the user has no access to individual file progress information for the composite file, such as how many files included in the composite file have been downloaded or any errors that may have occurred for particular files included in the composite file while the composite file is being downloaded.

Accordingly, embodiments described herein provide progress information for composite information, which can be shared with user devices for display to a user. For example, as described in more detail below, a media server, which transmits a composite file to a user device, may be configured to transmit progress information to a notification server. The notification server forwards the progress information to the user device for display to a user.

For example, one embodiment provides a system for tracking the download progress of a composite file, such as a zip file. The system includes a notification server and a media server. The notification server is configured to provide a token to a browser application executed by a user device. The token uniquely identifies a user session between the browser application and a cloud storage service. The media server is configured to receive the token from the browser application associated with a download request for a set of files, create a composite file including the set of files, transmit the composite file to the user device, and, while transmitting the composite file to the user device, transmit progress information and the token to the notification server. The progress information includes a number of files in the composite file transmitted to the user device. The notification server is further configured to receive the progress information and the token from the media server, determine the user session based on the token, and, based on the user session, transmit the progress information to the user device for display within the browser application.

Another embodiment provides a method of tracking download progress of a composite file. The method includes receiving, with an electronic processor, a download request for a set of files from a user device, creating, with the electronic processor, a composite file including the set of files, and transmitting the composite file to the user device via a first communication channel. The method also includes, while transmitting the composite file to the user device, transmitting, with the electronic processor, progress information for display on a display device of the user device via a second communication channel, the progress information including a number of files in the set of files transmitted.

Yet another embodiment provides non-transitory computer-readable medium storing instructions that, when executed with an electronic processor, perform a set of functions. The set of functions including providing a token to a browser application executed by a user device, the token uniquely identifying a user session between the browser application and a cloud storage service and receiving, during transmission of a composite file to the user device from a media server, the token and progress information from the media server, the progress information including a number of files included in the composite file transmitted to the user device. The set of functions further includes determining the user session based on the token, and, based on the user session, transmitting the progress information to the user device for display within the browser application.

Other aspects of the invention will become apparent by consideration of the detailed description and accompanying drawings.

DETAILED DESCRIPTION

Figure 1:
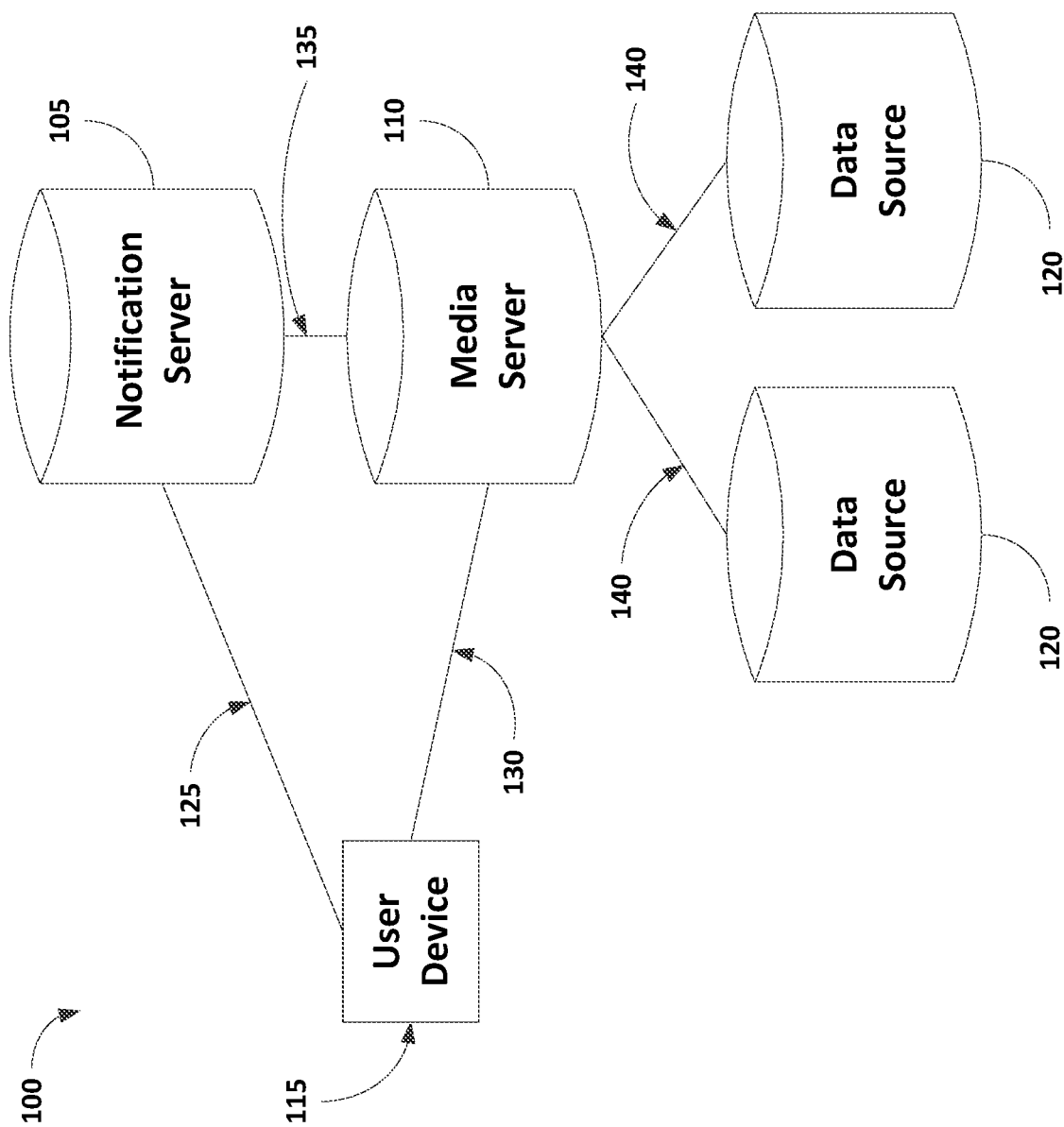
FIG. 1 schematically illustrates a system for tracking the download progress of a composite file accordingly to one embodiment.

One or more embodiments are described and illustrated in the following description and accompanying drawings. These embodiments are not limited to the specific details provided herein and may be modified in various ways. Furthermore, other embodiments may exist that are not described herein. Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way, but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms such as first and second, top and bottom, and the like may be used herein solely to distinguish one entity or action from another entity or action without necessarily requiring or implying any actual such relationship or order between such entities or actions.

As noted above, embodiments described herein provide progress information regarding the transmission of a composite file to an electronic device (a user device). The progress information includes the number of files included in the composite file, the number of files included in the composite file that have been transmitted to the user device, information about errors that occurred when transmitting the composite file, or a combination thereof. The user device is configured to display the progress information, which allows a user to better manage the download. For example, based on the progress information, the user device may allow a user to cancel a downloaded, retry a download (such as when an error is reported), or the like.

FIG. 1 schematically illustrates a system 100 for tracking the download progress of a composite file. As used in the present application, a composite file refers to a file that includes a set of files. In some embodiments, a composite file is a compressed file that is smaller in size than the original files, which makes downloading faster and easier and makes efficient use of memory. For example, the composite file may include a ZIP file, a RAR file, a ARJ file, a TAR.GZ file, or a TGZ file. The set of files included in a composite file may include one or more folders (also sometimes referred to as directories) that include a set of files. Accordingly, although examples described herein may relate to files included in a composite file, the functionality described herein can also be applied to a set of folders included in a composite file.

As illustrated in FIG. 1, the system 100 includes a notification server 105, a media server 110, a user device 115, and, optionally, one or more data sources 120. The notification server 105, the media server 110, and the data sources 120 provide a cloud storage service to the user device 115. The notification server 105, the media server 110, the user device 115, and the data sources 120 communicate over one or more wired or wireless communication channels 125, 130, 135, 140, which may be implemented using a wide area network, such as the Internet, a local area network, such as a Bluetooth™ network or Wi-Fi, and combinations or derivatives thereof. It should be understood that the system 100 may include any number of user devices, and the single user device 115 illustrated in FIG. 1 is purely for illustrative purposes. It should also be understood that the system 100 may include any number of data sources 120 each connected to the media server 110 via a separate communication channel or a shared communication channel, and that the two data sources 120 and two channels 140 illustrated in FIG. 1 are purely for illustrative purposes. Also, in some embodiments, the notification server 105, media server 110, user device 115, and data sources 120 may communicate with one another through one or more intermediary devices (not shown). In addition, the functionality described herein as being performed by the notification server 105, the media server 110, or both may be distributed among multiple servers, such as servers included in a cloud environment.

Figure 2:
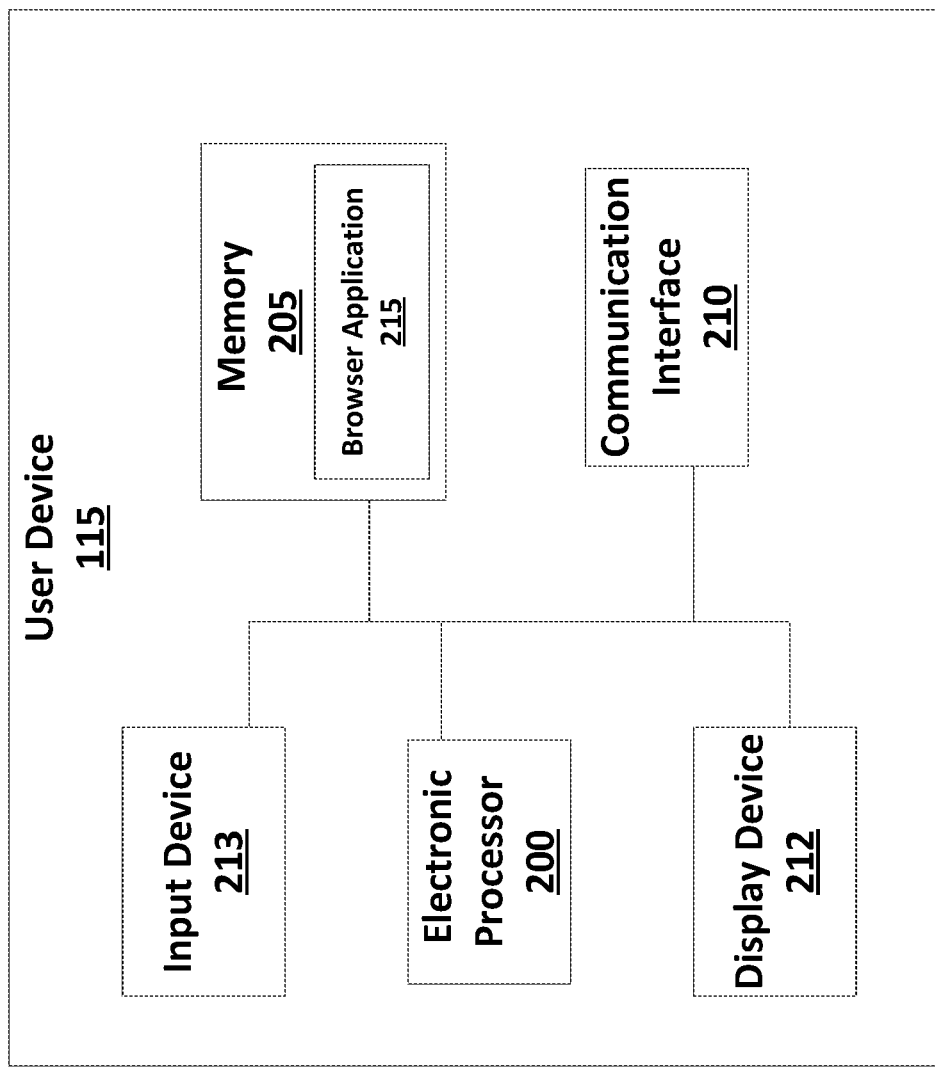
FIG. 2 schematically illustrates a user device included in the system of FIG. 1 according to one embodiment.

As illustrated in FIG. 2 the user device 115 is an electronic device, such as a smart phone, a smart watch, a tablet computer, a laptop computer, a smart television, a mixed reality headset, or the like, that includes an electronic processor 200 (for example, a microprocessor, application-specific integrated circuit (ASIC), or another suitable electronic device), a memory 205 (a non-transitory, computer-readable storage medium), and a communication interface 210 (for example, a transceiver) for communicating over the communication channels 125, 130, and, optionally, one or more additional communication channels. The user device 115 also includes a display device 212 and an input device 213. The display device 212 may include, for example, a touchscreen, a liquid crystal display (LCD), a light-emitting diode (LED) display, an organic LED (OLED) display, an electroluminescent display (ELD), and the like. The input device 213 may be, for example, a keypad, a mouse, a touchscreen, a microphone, a camera, or the like. The electronic processor 200, the memory 205, the communication interface 210, the display device 212, and the input device 213 communicate over one or more communication lines or buses. It should be understood that the user device 115 may include additional components than those illustrated in FIG. 2 in various configurations and may perform additional functionality than the functionality described in the present application.

The electronic processor 200 is configured to execute instructions stored in the memory 205. For example, in some embodiments, the memory 205 stores a browser application 215 configured to (when executed by the electronic processor 200) access the cloud storage service provided via the notification server 105, the media server 110, and the data sources 120. In some embodiments, the browser application 215 is a web browser. In other embodiments, the browser application 215 is a dedicated application for accessing the cloud storage service. As described in more detail below, the browser application 215 can create a user session with the cloud storage service to access and download files over one or more communication channels. For example, as illustrated in FIG. 1, the browser application 215 may communicate with the notification server 105 over the communication channel 125 and communicate with the media server 110 over the communication channel 130.

Figure 3:
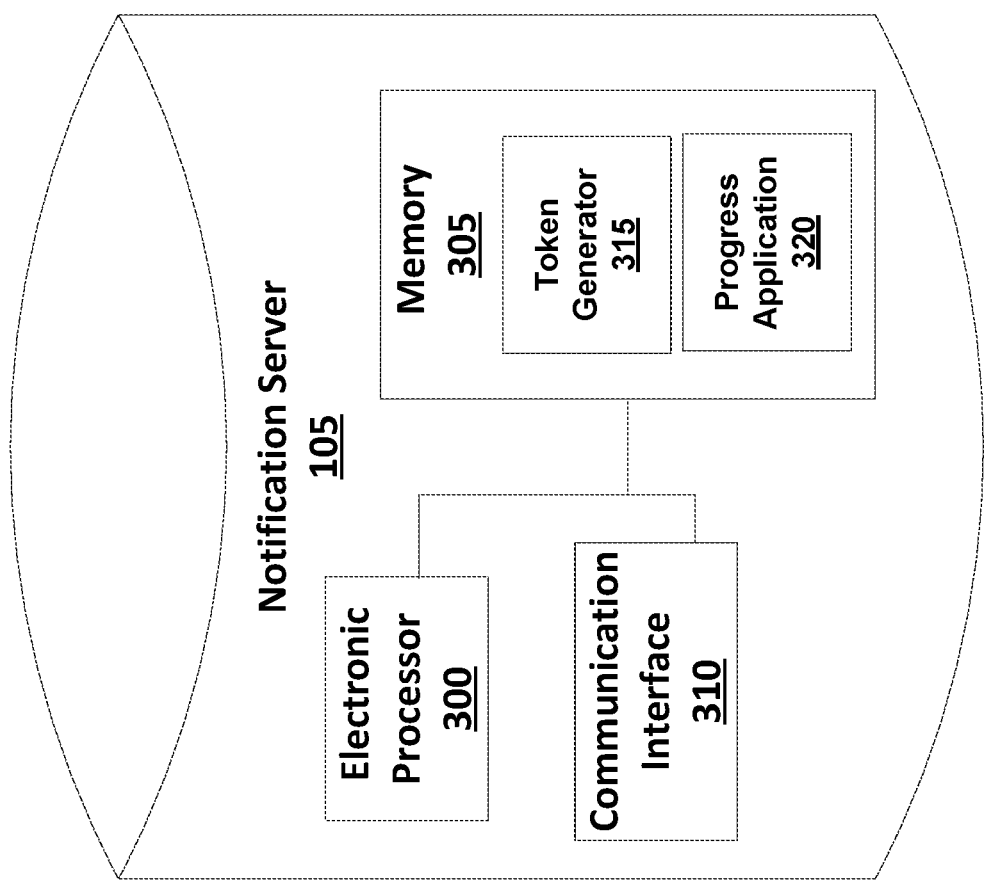
FIG. 3 schematically illustrates a notification server included in the system of FIG. 1 according to one embodiment.

As illustrated in FIG. 3, the notification server 105 is an electronic device, such as a server, that includes an electronic processor 300 (for example, a microprocessor, application-specific integrated circuit (ASIC), or another suitable electronic device), a memory 305 (a non-transitory, computer-readable storage medium), and a communication interface 310, such as a transceiver, for communicating over the communication channels 130, 135, and, optionally, one or more additional communication networks or connections. The electronic processor 300, the memory 305, and the communication interface 310 communicate over one or more communication lines or buses. It should be understood that the notification server 105 may include additional components than those illustrated in FIG. 3 in various configurations and may perform additional functionality than the functionality described in the present application.

The electronic processor 300 is configured to execute instructions stored in the memory 305. For example, as illustrated in FIG. 3, the electronic processor 300 may be configured to execute a token generator 315 and a progress application 320 stored in the memory 305. The token generator 315 may be configured to generate a unique token for each user session established with the cloud storage service. For example, the token may be unique to the user using the cloud storage service, the browser application 215 used by the user, the user device 115 used by the user, or a combination thereof. The notification server 105 transmits the generated token to the user device 115 via the communication channel 125.

The progress application 320 may be configured to receive progress information from the media server 110 via the communication channel 130 and transmit the progress information to the user device 115 for display within the browser application 215 via the communication channel 130. For example, as described in more detail below, the media server 110 is configured to transmit progress information to the notification server 105 while a composite file is transmitted to the user device 115, which the notification server 105 relays to the user device 115. The media server 110 may include a token with the progress information, which allows the notification server 105 to determine what user session received progress information relates to. Thus, the notification server 105 acts as an intermediary device for indirect communication between the media server 110 and the user device 115. Communicating via the notification server 105 allows the media server 110 to use the communication channel 125 to transmit files included in the composite file to the user device 115 without interruption. Also, communicating via the notification server 105 allows the notification server 105 to provide progress information to the user device 115 in situations when the communication channel 130 with the media server 110 is lost or malfunctions. The notification server 105 determines which user device to transmit progress information to based on the token that the notification server 105 received from the media server 110.

Figure 4:
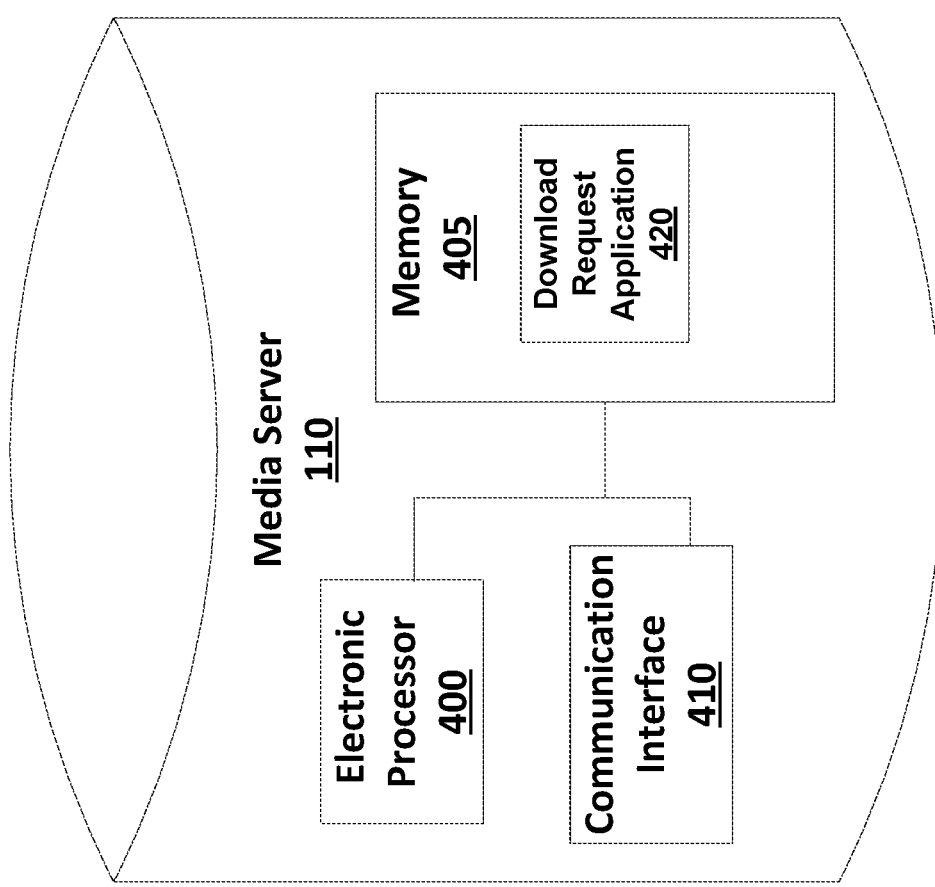
FIG. 4 schematically illustrates a media server included in the system of FIG. 1 according to one embodiment.

As illustrated in FIG. 4 the media server 110 is an electronic device, such as a server, that includes an electronic processor 400 (for example, a microprocessor, application-specific integrated circuit (ASIC), or another suitable electronic device), a memory 405 (a non-transitory, computer-readable storage medium), and a communication interface 410 (for example, a transceiver), for communicating over the communication channels 125, 135, 140, and, optionally, one or more additional communication networks or channels. The electronic processor 400, the memory 405, and the communication interface 410 communicate over one or more communication lines or buses. It should be understood that the media server 110 may include additional components than those illustrated in FIG. 4 in various configurations and may perform additional functionality than the functionality described in the present application.

The electronic processor 400 is configured to execute instructions stored in the memory 405. For example, as illustrated in FIG. 4, the electronic processor 400 is configured to execute a download request application 420 to process download requests received from the user device 115 via the communication channel 130. As noted above, the download request application 420 may be configured to generate a composite file in response a request for a set of files to make downloading easier and faster. For example, the download request application 420 may be configured to generate a compressed file that includes a set of files requested by a user. The set of files may be organized in one or more folders, wherein each folder includes a set of files, a set of folders, or both. Accordingly, a hierarchy of folders included in the composite file may define an organization structure of the composite file.

One or more files included in the composite file may be stored locally on the media server 110. Alternatively or in addition, one or more files included in the composite file may be stored on an external data source 120, which the media server 110 may access via the communication channel 140. In response to generating the composite file, the electronic processor 400 transmits the composite file to the user device 115 via the communication channel 130 (as a single file). In some embodiments, the electronic processor 400 also transmits to the organizational structure of the composite file to the user device 115 via the communication channel 130. As noted above, while transmitting the composite file to the user device 115, the electronic processor 400 also transmits progress information to the notification server 105 via the communication channel 135.

Figure 5:
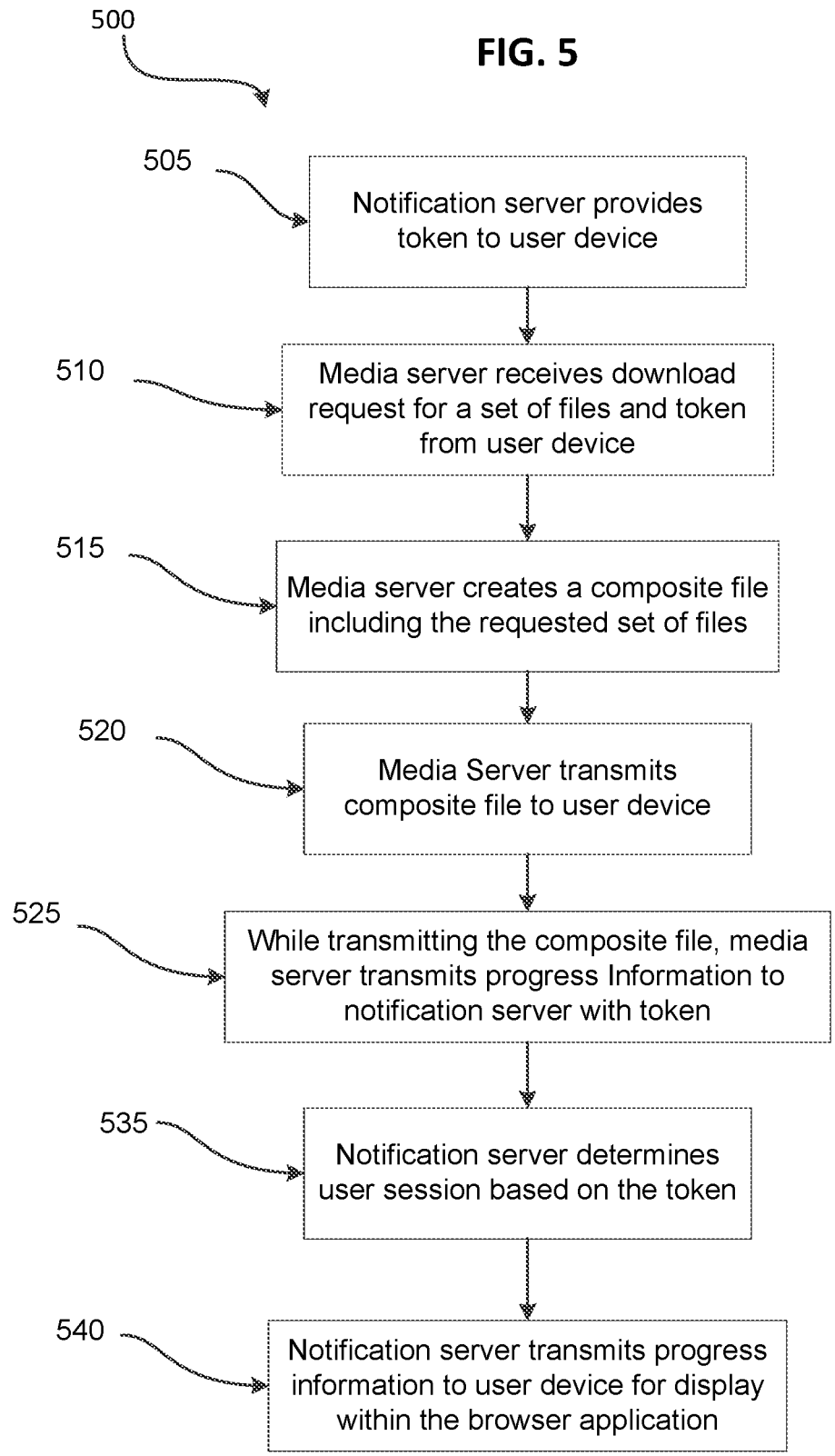
FIG. 5 is a flow chart illustrating a method of tracking download progress of a composite file performed by the system of FIG. 1 according to one embodiment.

For example, FIG. 5 illustrates a method 500 of tracking the download progress of a composite file using the system 100. The system 100 is described as being performed by the notification server 105, the media server 110, and the user device 115. However, it should be understood that the functionality described herein as being performed by the notification server 105, the media server 110, or the user device 115 is performed by each component's respective electronic processor executing instructions, including, for example, the software applications described above and illustrated in FIGS. 2-4.

As illustrated in FIG. 5, the user device 115 establishes a user session with the cloud storage service and receives a token from notification server 105 via the communication channel 125 (at block 505). As described above, the token uniquely identifies the user session. When the user device 115 subsequently transmits a download request for a set of files to the media server 110, the user device 115 also transmits the token (at block 510).

As described above, the media server 110 creates a composite file including the set of files specified in the download request (at block 515). As noted above, in some embodiments, the media server 110 accesses one or more data sources 120 to retrieve one or more files for the composite file. However, in other embodiments, the media server 110 retrieves one or more files for the composite file from local memory.

After creating the composite file, the media server 110 transmits the composite file to the user device 115 (at block 520). In some embodiments, the media server 110 also transmits organizational structure of the composite file to the user device 115. While the media server 110 transmits the composite file to the user device 115, the media server 110 also transmits progress information to the notification server 105 (at block 525). The media server 110 also transmits the token received with the download request to the notification server 105 to identify the user session that the progress information relates to. In some embodiments, the progress information includes the number of files that have been downloaded (transmitted) to the user device 115. The progress information may also include the total number of files included in the composite file. The progress information may also include a number of folders that have been downloaded and a total number of folders included in a composite file. In addition, the progress information may include any errors that occurred for particular files (or folders) included in the composite file. The media server 110 may be configured to transit the progress information to the notification server 105 with a predetermined frequency, upon the occurrence of an event (completing transmission of a file included in the composite file), or a combination thereof.

Figure 6:
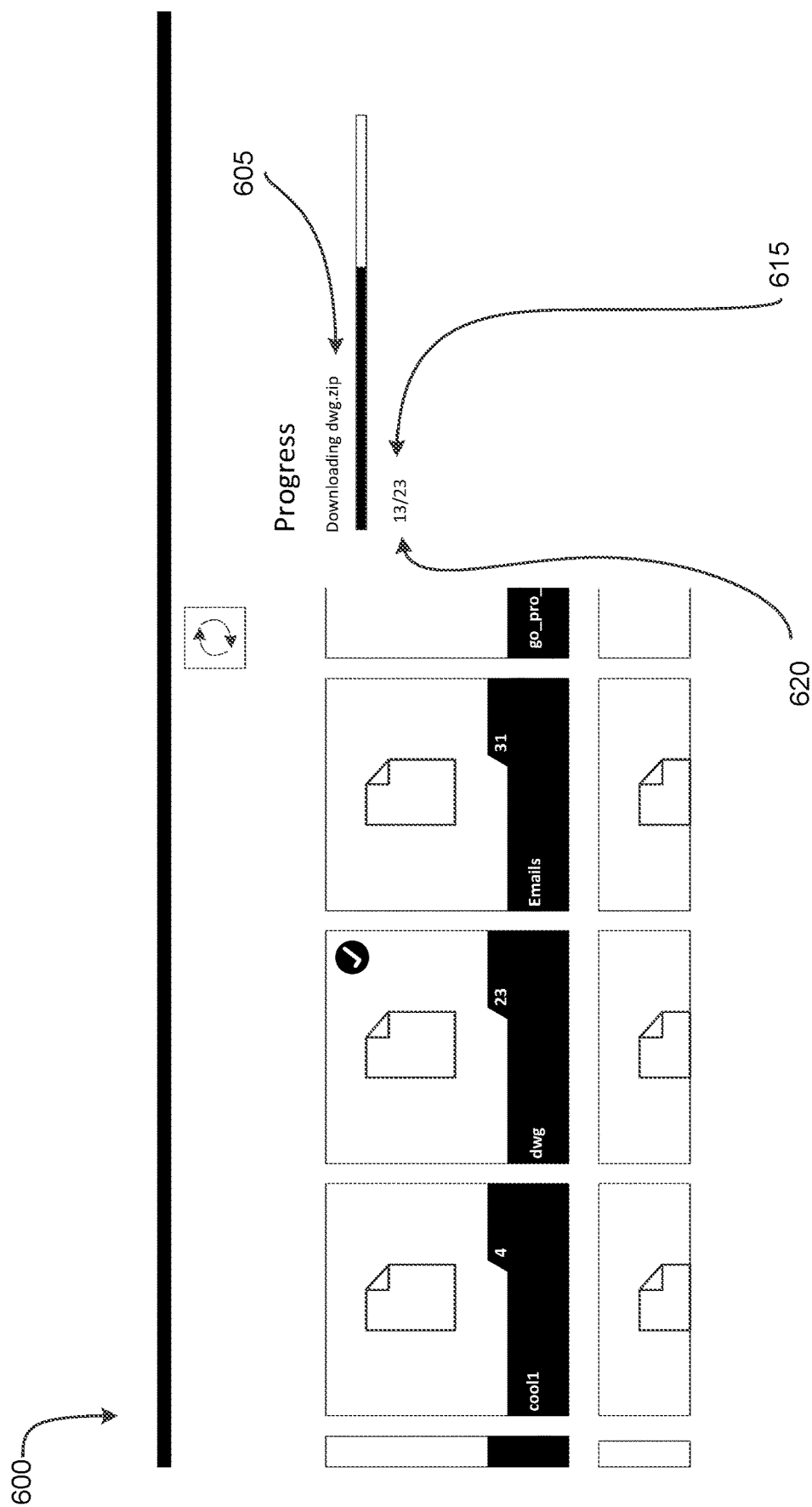
FIG. 6 illustrates an example graphical user interface including download progress of a composite file that is displayed on a display device of the user device of FIG. 2.

Based on the token received from the media server 110 with the progress information, the notification server 105 determines the user session that the token is associated with (at block 535). Based on the determined user session, the notification server 105 transmits the progress information to the user device 115 (at block 540), which is displayed at the user device 115 via the display device 212. For example, FIG. 6 illustrates a portion of a graphical user interface 600 displayed by the browser application 215 on the display device 212 of the user device 115. The graphical user interface 600 provides progress information for a composite file named "dwg.zip," which includes a folder of twenty-three files. In addition to providing a progress bar 605 graphically illustrating a percentage of the composite file that has been downloaded, the graphical user interface 600 displays a total number of files included in the composite file (numerical value 615 illustrated in FIG. 6) and a number of files included in the composite file that have been downloaded (have been transmitted from the media server to the user device 115) (numerical value 620 illustrated in FIG. 6). In particular, for the example illustrated in FIG. 6, 13 files of the 23 files included in the composite file named "dwg.zip" have been downloaded. It should be understood that the progress information may be displayed numerically, textually, graphically, audibly, or as a combination thereof. For example, in some embodiments, a progress bar, pie chart, or the like may be used to graphical illustrate a number of files that have been downloaded within the composite file. Also, additional information may be provided regarding the downloaded files and the yet-to-be-downloaded files, such as file names, size, file path, and the like. It should also be understood that the notification server 105 may be configured to modify the progress information as received form the media server 110. For example, the notification server 105 may be configured track what files have been downloaded based on progress information provided by the media server 110 and translate this information to a number of files that have been downloaded.

Accordingly, the progress information displayed to a user via the user device 115 allows a user to better manage a download of a composite file by understanding how many files of the composite file have been downloaded. Also, in some embodiments, various input mechanisms may be displayed with the progress information that allows a user to cancel, pause, resume, or retry a download. For example, a user may be able to cancel or pause a download after a particular file has downloaded to review the downloaded file (such as to confirm that further files are needed) and optionally resume the downloaded thereafter. Similarly, a user may be able to retry downloading a composite file (or individual files included in the composite file) based on errors reported as part of the progress information. In some embodiments, user commands regarding a download may be transmitted to the notification server 105, which may relay the command to the media server 110 (for example, with the token to identify a particular user session and download). In other embodiments, user commands regarding a download may be transmitted to the media server 110 without involving the notification server 105.

Thus, embodiments described herein provide systems and methods for providing progress information during download of a composite file, wherein the progress information provides information on the download of individual files included in the composite file, such as the number of files that have been downloaded and any errors occurring with respect to individual files. Accordingly, a user can better control downloads and make more efficient use of memory and communication channels.

Various features and advantages of some embodiments are set forth in the following claims.

What is claimed is:

1. A system for tracking download progress of a composite file, the system comprising:
a notification server configured to provide a token to a browser application executed by a user device, the token uniquely identifying a user session between the browser application and a cloud storage service; and
a media server configured to
receive the token from the browser application associated with a download request for a set of files,
create a composite file including the set of files,
transmit the composite file to the user device, and
while transmitting the composite file to the user device, transmit progress information and the token to the notification server, the progress information including a number of files in the composite file transmitted to the user device,
wherein the notification server is further configured to
receive the progress information and the token from the media server,
determine the user session based on the token, and
based on the user session, transmit the progress information to the user device for display within the browser application.

2. The system according to claim 1, wherein the composite file includes a compressed file.

3. The system according to claim 1, wherein the composite file includes a plurality of folders including a plurality of files included in the set of files.

4. The system according to claim 3, wherein the progress information includes a number of the plurality of folders transmitted to the user device.

5. The system according to claim 1, wherein the progress information includes a total number of files included in the composite file.

6. The system according to claim 1, wherein the progress information includes error information for at least one file included in the composite file.

7. The system according to claim 1, wherein the media server is configured to create the composite file including the set of files by retrieving a file included in the set of files from a data source external to the media server.

8. A method of tracking download progress of a composite file, the method comprising:
receiving, with an electronic processor, a download request from a user device, the download request specifying a plurality of user-requested files;

creating, with the electronic processor, a single composite file including the plurality of user-requested files specified in the download request;
transmitting the single composite file to the user device via a first communication channel;
while transmitting the single composite file to the user device, transmitting, with the electronic processor, progress information for display on a display device of the user device via a second communication channel, the progress information including a number of files in the plurality of user-requested files included in the single composite file that have been transmitted to the user device; and
receiving a token associated with the download request, wherein the token uniquely identifies a user session,
wherein transmitting the progress information includes transmitting the progress information and the token via the second communication channel.

9. The method according to claim 8, wherein creating the single composite file includes creating a compressed file including a plurality of folders containing the plurality of user-requested files and wherein transmitting the progress information includes transmitting a number of folders in the plurality of folders that have been transmitted to the user device.

10. The method according to claim 8, wherein transmitting the progress information includes transmitting a total number of files included in the single composite file.

11. The method according to claim 8, wherein transmitting the progress information includes transmitting error information for a file included in the single composite file.

12. The method according to claim 8, wherein transmitting the progress information via the second communication channel includes transmitting the progress information to a notification server via the second communication channel.

13. The method according to claim 8, wherein creating the single composite file includes retrieving a file included in the plurality of user-requested files from an external data source.

14. Non-transitory computer-readable medium storing instructions that, when executed with an electronic processor, perform a set of functions, the set of functions comprising:
providing a token via a first communication channel to a browser application executed by a user device, the token uniquely identifying a user session between the browser application and a cloud storage service;
receiving, during transmission of a single composite file to the user device from a media server via a second communication channel, the token and progress information from the media server, the single composite file including a plurality of user-requested files and the progress information including a number of the plurality of user-requested files included in the single composite file that have been transmitted to the user device;
determining the user session based on the token; and
based on the user session, transmitting the progress information to the user device via the first communication channel for display within the browser application.

15. The computer-readable medium according to claim 14, wherein the single composite file includes a compressed file including a set of files.

16. The computer-readable medium according to claim 14, wherein receiving the progress information includes receiving a total number of files included in the single composite file.

17. The computer-readable medium according to claim 14, wherein receiving the progress information includes receiving error information for a file included in the single composite file.

18. The computer-readable medium according to claim 14, wherein receiving the progress information includes receiving a number of folders included in the single composite file transmitted to the user device.

* * * * *